Oct. 10, 1950         R. K. HOPKINS         2,525,133
MANUFACTURE OF COMPOSITE METAL ARTICLES
Filed June 22, 1945         2 Sheets-Sheet 1
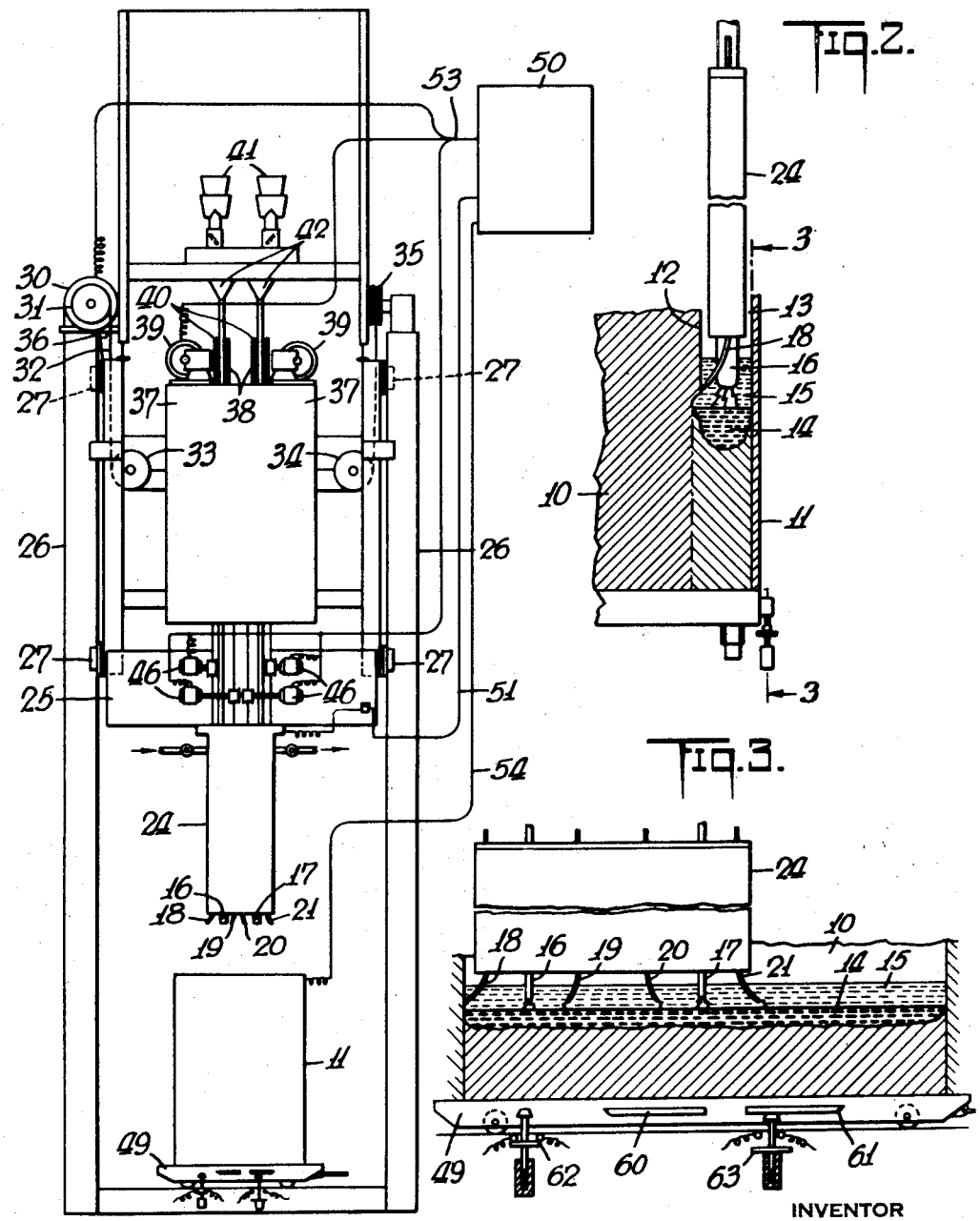
INVENTOR
*Robert K. Hopkins*
BY *Virgil F. Davis*
ATTORNEY

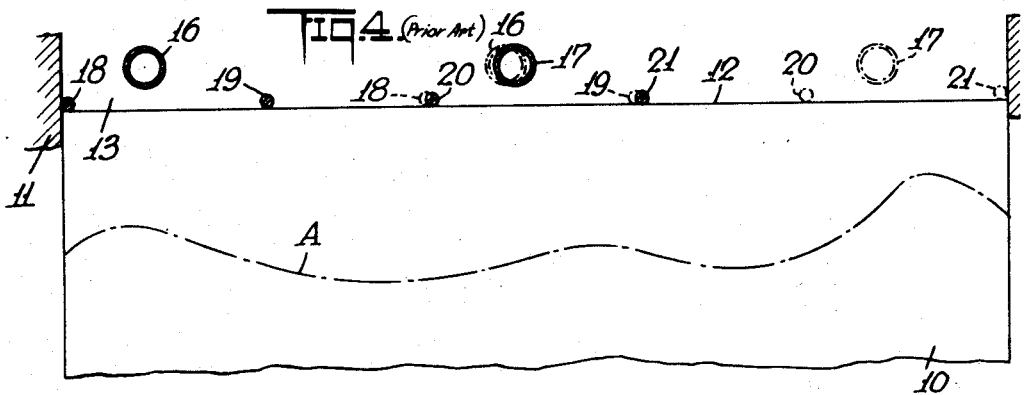
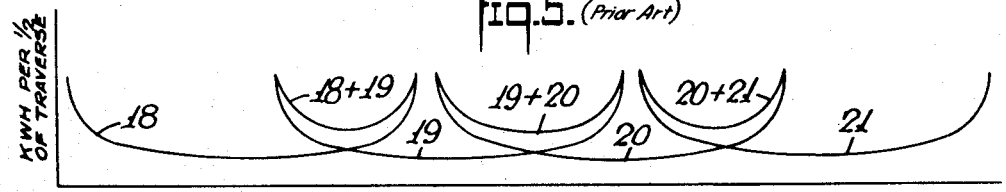
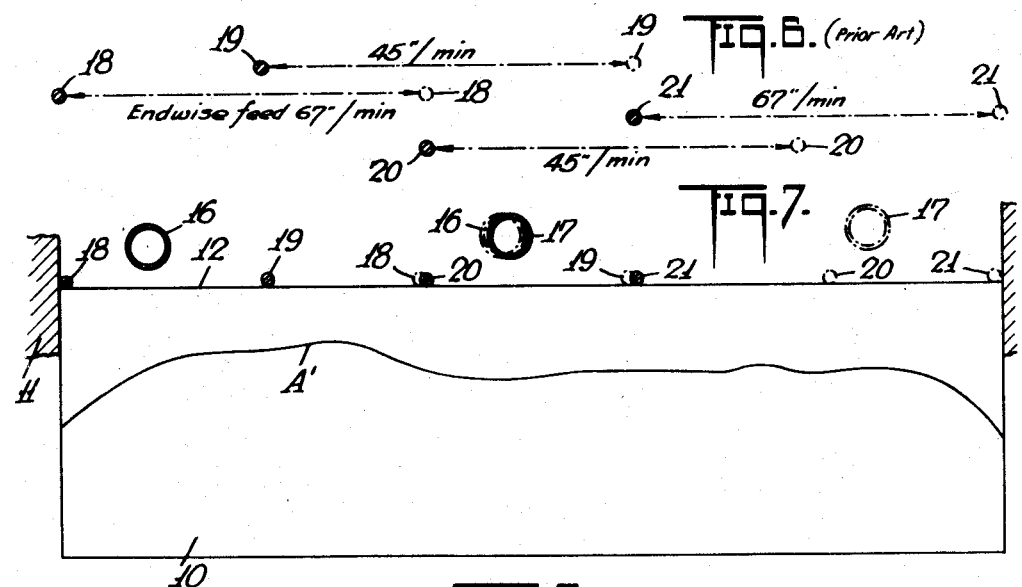
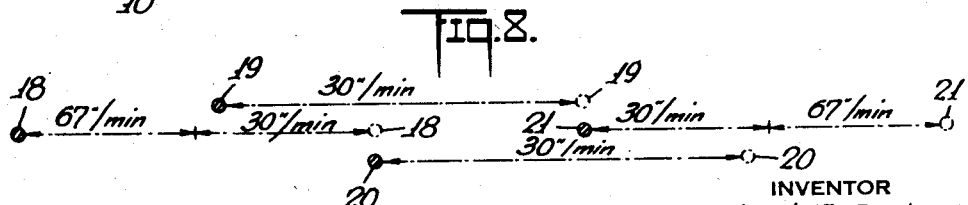

Patented Oct. 10, 1950

2,525,133

UNITED STATES PATENT OFFICE 2,525,133

MANUFACTURE OF COMPOSITE METAL ARTICLES

Robert K. Hopkins, New York, N. Y., assignor to The M. W. Kellogg Company, New York, N. Y., a corporation of Delaware Application June 22, 1945, Serial No. 600,939

4 Claims. (Cl. 22—204)

The present invention relates to the art of making composite metal articles, and more particularly to the art of forming a metal coating layer on base metal by fusing the surface of the base metal and integrally bonding a coating metal of the desired composition to said fused surface.

In one known process of producing a composite metal article, a base metal workpiece with a substantially flat surface is oscillated relative to the metal producing and fusing elements of the apparatus. The surface fusing means comprises a plurality of spaced electrodes, which are oscillated in unison relative to the base metal workpiece, and which are simultaneously advanced relative to said workpiece in a direction transverse to the direction of relative oscillating movement to effect progressive areal coverage of said surface by said electrodes in surface fusing relationship therewith.

In carrying out this process, the courses of the electrodes are made to overlap during oscillations to assure complete coverage of the surface of the base metal workpiece, and their speed relative to said workpiece is substantially reduced near the ends of their strokes due to the inherent characteristics of the oscillating mechanism employed. As a result of this condition, the total metal fusing energy input across the flat face of the workpiece per unit length of electrode oscillating traverse is varied, so that the depth of fusion of the workpiece varies along its length. The metal coating layer of the resulting composite article is of non-uniform thickness and the composite shows an undulating line, of substantial amplitude, where the base metal and the coating are integrally bonded together.

The coating of non-uniform thickness produced by this process has the disadvantage of requiring a greater quantity of coating metal to be deposited in order to assure a coating of minimum guaranteed thickness.

Also, a coating of non-uniform thickness in a composite article is disadvantageous and undesirable when fabricating products from such articles, since the apparatus and operations for handling these articles would normally be geared, set and adjusted to handle metal having definite constant qualities. Also, non-uniformity in the thickness of the coating metal may impart to the qualities of the material processed, such as resistance to flow, such variations as to upset the efficiency of these operations.

Moreover, a coating of non-uniform thickness on a composite article is undesirable when the article is to be welded. In the usual operations of welding composite articles together, the alloy coating metals are welded with corresponding alloy metal electrodes, and the carbon steel bases are welded with carbon steel electrodes. To this end, welding grooves are cut of definite depth. If the alloy thickness is not uniform, it will be necessary to cut a groove for the greatest depth of alloy. As a result, where the coating alloy layer is of smaller thickness, alloy will be employed in part to weld the carbon steel sections.

One object of the present invention is to provide a new and improved process for producing a composite article having a base metal and a coating metal of substantially uniform thickness integrally bonded thereto.

In carrying out certain features of the present invention, heat generating electrodes are oscillated as a unit relative to the substantially flat bonding surface of a solid metal body, and in metal fusing position with respect thereto to fuse said surface. The total energy input from these electrodes per unit length of electrode traverse is substantially equalized to control the depth of fusion, and thereby to produce a substantially straight penetration line in the solid metal body. The electrodes are also advanced as a unit relative to said surface in a direction transverse to the direction of oscillating movement of the electrodes to effect progressive areal coveral of said surface by said electrodes in surface fusing relationship therewith. At the same time, the coating metal is deposited in contact with the fused surface of the body to effect an integral bond between the metals.

In the specific embodiment of the present invention, the total energy input from the surface fusing electrodes per unit length of electrode traverse is substantially equalized by reducing the current input of an electrode of each pair of successive electrodes per unit length of electrode traverse during the overlapping phase of its oscillation stroke relative to the base metal, while maintaining said current input substantially constant for a major portion of the remaining phase of its relative oscillation stroke. In this manner, a substantially flat plane is assured where the two metals of the composite article are integrally bonded together, with a result that the coating metal will be substantially uniform in thickness.

Various other objects, features and advantages of the invention will be apparent from the following particular description, and from an inspection of the accompanying drawings, in which—

Fig. 1 is a front elevation somewhat diagrammatic of an apparatus which embodies the features of the present invention, and which may be employed to carry out the process of the present invention, this apparatus being shown in inoperative position with the electrodes raised above their field of operation.

Fig. 2 is a side sectional view somewhat diagrammatic of a portion of the apparatus, but showing the electrodes in operative position;

Fig. 3 is a front sectional view of a portion of the apparatus taken along the lines 3—3 of Fig. 2;

Fig. 4 is a plan view of a base metal workpiece, and shows the penetration line produced in said workpiece by a process in which the current input from each electrode is maintained substantially constant throughout the operation;

Fig. 5 shows approximate curves for the respective electrodes and indicates for different positions of these electrodes with respect to the surface of the base metal workpiece, the kilowatt hours input per unit of electrode traverse resulting from an operation in which the current input from each electrode is maintained substantially constant throughout, the horizontal abscissa increments in these curves corresponding to the horizontal increments in Fig. 4;

Fig. 6 is a diagram which shows the paths of oscillating movements of the electrodes and their rates of endwise feed as they are consumed, corresponding to the conditions shown in Figs. 4 and 5, the horizontal increments in this diagram corresponding to the horizontal increments in Figs. 4 and 5;

Fig. 7 is a plan view of a base metal workpiece, and shows the penetration line produced by the process and apparatus of the present invention; and Fig. 8 is a diagram which shows the paths of oscillating movements of the electrodes and their rates of endwise feed in accordance with the features of the present invention, the horizontal increments in this diagram corresponding to the horizontal increments in Fig. 7.

The novel method of the present invention may be employed in the manufacture of coated articles having a wide range of compositions. The base metal may be carbon steel, iron or any of the ferrous or non-ferrous metals and alloys commonly used in the manufacture of machines, apparatus, vessels, containers, structural members, etc. The coating metal may be of any ferrous or non-ferrous metal or alloy, such as chrome steel, manganese steel, chrome-nickel steel, Monel metal, etc., having desirable properties, such as corrosion, oxidation and/or wear resisting properties, superior to those of the base workpiece.

The novel method may be be employed for manufacturing coated articles that are substantially in their finished form after the coating operation, or it may be employed for manufacturing intermediate articles or workpieces, such as ingots, slabs, billets, cylinders and the like, from which the final articles are produced by working operations, such as forging, rolling, etc.

The apparatus for carrying out the process of the present invention may be similar to that shown in my prior United States Patents Nos. 2,279,990 and 2,191,481. As indicated in these patents, the base metal 10 in the form of an ingot, billet, slab, bar, etc., is associated with a mold 11 in such a way that the face 12 of the base metal to be coated is substantially vertically disposed, and defines with the mold walls a space 13 shaped and dimensioned to accommodate the coating metal. This mold 11 may be made of any suitable material such as iron, steel, copper or refractory material, and may be liquid-cooled during coating operations.

The coating metal is fused and deposited as a body of molten metal 14 in the mold space 13 beneath a blanket of protective flux 15, and is united to the base metal 10 under the influence of electric current discharges from electrodes submerged at their lower ends beneath the surface of said flux blanket. The operation is so controlled that the whole of the top surface of the deposited metal, i. e., the deposited metal immediately beneath the flux 15, is in the molten condition throughout the period of operation.

Two hollow electrodes 16 and 17 and four wire electrodes 18, 19, 20 and 21 are shown for purposes of illustration, although any number and combination of these may be provided. Electrodes 16, 17, 18, 19, 20 and 21 are guided through a water-cooled contact device 24 where contact communication between the electrodes and their respective current supplies is continuously maintained throughout the entire operation.

The electrodes are moved vertically as a unit as the welding operation proceeds. In order to effect this vertical unisonal movement of the electrodes, the contact device 24 is fixed to the lower end of a carriage 25, guided by rollers 27 for vertical movement along vertical rail frame members 26. Carriage 25 is shown raised or lowered by means of a variable speed hoist motor 30 supported on the frame structure of the machine, and driving a cable drum 31. A cable 32 passes from the drum 31 under sheaves 33 and 34, over sheave 35, under two sheaves (not shown) disposed in back of sheaves 33 and 34, and then upwardly, the end of said cable being fastened to the frame as at 36.

The carriage 25 has mounted thereon a pair of tube forming mechanisms 37 which receive metal strips 38 from reels 40 to form the hollow electrodes 16 and 17, and which are operated from motors 39.

The hollow electrodes 16 and 17 are made up of one or more of the major constituents of the desired coating metal, and may contain other constituents required to be fused with it. Other ingredients necessary to produce a coating metal of the desired analysis may be fed in pulverant, powder, granular, or other fluent form to the fusing zone of the electrodes 16 and 17 through the hollows of said electrodes. These other ingredients in fluent form may be measured by metering devices 41 and fed therefrom at controlled rates through the funnels 42 and into the hollow electrodes 16 and 17, from which they are delivered to the fusing zone of these electrodes to produce with the metal fused from base metal 10, the metal from said electrodes and the wire electrodes 18, 19, 20 and 21 a coating metal of the desired analysis.

Since one of the primary functions of the wire electrodes 18, 19, 20 and 21 is to fuse the surface metal of the base metal workpiece near the surface zone of the rising liquid coating metal 14, the contact guide of each wire electrode in the contact device 24 is shaped to direct said wire electrode at an angle towards the surface of said workpiece. In addition, the contact guides of the outer wire electrodes 18 and 21 are shaped to direct these electrodes laterally outwardly from the sides of the contact device 24, so that these wire electrodes can reach the outer edges of the workpiece 11.

As the electrodes 16, 17, 18, 19, 20 and 21 are consumed, they are fed endwise at controlled rates. The hollow electrodes 16 and 17 are fed by the motors 39, which also serve to operate the tube forming devices 37. The wire electrodes 18, 19, 20 and 21, on the other hand, are fed at controlled rates by means of respective motors 46.

As the level of the deposited coating metal 14 in the mold space rises, the contact device 24 and the electrodes 16, 17, 18, 19, 20 and 21 therein are raised in unison through the operation of the hoist motor 30 and at a rate corresponding to the rising rate of said level to maintain during the entire operation the ends of the electrodes 18, 19, 20, and 21 in fixed position relative to the surface of base metal 10 and the surface of molten deposited metal 14.

As already indicated, electrodes 18, 19, 20 and 21 are successively arranged alongside of each other in spaced relationship, and are angularly directed to discharge in the zone of the meeting line between the surface of the deposited coating metal 14 and the face 12 of the workpiece 10, so as to present a fused surface to the rising deposited metal 14. In order that the surface of the workpiece 10 be always in the fused condition for the full length of this zone, contact device 24 is oscillated back and forth along the length of mold space 13 and at the proper rate relative to the workpiece 10, while the electrodes 16, 17, 18, 19, 20 and 21 are fed downwardly at a rate corresponding to their rate of consumption, and are raised as a unit at a rate corresponding to the rate with which the level of the deposited molten coating metal 14 rises. This relative oscillatory movement between the workpiece 10 and the contact device 24 may be accomplished, as for example, by having the workpiece 10 and mold 11 supported on a rail mounted truck 49 as shown, and moving this truck back and forth by a suitable drive mechanism, as shown for example in my prior Patent No. 2,279,990, or by having the contact device 24 supported on a horizontally movable carriage, while the workpiece 10 and the mold 11 are fixed against horizontal movement, as shown in my prior Patent No. 2,191,481.

The electric current delivered to the respective electrodes through the contact device 24 may come from individual generators, transformers, etc., which for the purpose of simplicity in disclosure are considered to be located in back of a control panel 50. While in actual practice the current is conducted to each electrode 16, 17, 18, 19, 20 and 21 by separate cables, for the sake of simplicity, a single master cable 51 is shown between the control panel 50 and the contact device 24. Contact device 24 includes a separate contact nozzle for each electrode, and each nozzle is electrically isolated from the other nozzles, and is individually connected to its proper current supply cable.

Current control arrangements, such as are used in the arc-welding and electric furnace arts, are provided in back of control panel 50 for each motor 39 and each motor 46. These arrangements control the operation of the motors to maintain electric discharges of substantially predetermined characteristics from the ends of their respective electrodes. Motors 39, as well as hoist motor 30, and wire feed motors 46, are connected to their respective control arrangements and current supply sources by appropriate leads or cables. For the sake of simplicity, a single cable 53 formed by grouping the leads or cables of the various motors is shown issuing from control panel 50 and branching to the various motors. A cable 54 is also shown between the mold 11 and the control panel grounding the workpiece 10 and the deposited coating metal 14.

The control for determining the electric energy input per unit length of traverse of electrodes 18, 19, 20, and 21 is desirably such that the energy input is automatically varied in accordance with the voltage drops across the gaps intervening between these electrodes and the surface of said workpiece to be fused by said electrodes. The voltage drops across these gaps, and in turn the energy input from the electrodes, are controlled by varying the rate of endwise feed of these electrodes as they are consumed. For example, by decreasing the rate of endwise feed of the wire electrodes, the electric energy input from said electrodes per unit of time is automatically decreased, and vice versa. The means per se by which this energy control is effected is well known in the arc-welding and electric furnace arts, and need not be set forth here with any greater particularity.

The electrodes 16, 17, 18, 19, 20 and 21 are horizontally oscillated as a unit relative to the workpiece 10 from one extreme position shown in Fig. 3, in which the end electrode 18 is close to one side edge of workpiece 10, to the other extreme position in which the other end electrode 21 is close to the other side edge of said workpiece. During this oscillatory movement the travels of the different wire electrodes 18, 19, 20 and 21 are made to overlap for substantial distances near the ends of their strokes in order to assure complete coverage of the surface of the base metal workpiece 10. Also, these electrodes in their oscillating movements have reduced speeds near the ends and beginnings of their strokes, due to the inherent mechanical characteristics of the reciprocating mechanism employed. Therefore, along the workpiece 10 where wire electrodes 18, 19, 20 and 21 overlap, and where they move at reduced speed, the total current input from these electrodes into the workpiece per unit length of electrode traverse is the greatest, assuming that the current density from each electrode remains constant during its entire oscillating movement. The final composite article produced will therefore have an undulated penetration line A approximately as shown in Fig. 4. Line A has comparatively deep channels where the courses of the wire electrodes 18, 19, 20 and 21 overlap, and where they slow down near the ends of their strokes, so that the resulting coating will be of varying thickness.

Fig. 5 shows curves which are marked to correspond with their respective electrodes, and which are plotted to indicate approximately the kilowatt hours per unit length of traverse of the individual electrodes for different positions of these electrodes in a typical prior art operation. The abscissas in these curves of Fig. 5 represent the distances traversed by the individual electrodes corresponding to the horizontal distances indicated in Fig. 4. Fig. 6 is a diagram which shows the oscillating path of travel of the individual electrodes and their rate of endwise feed in a prior art process which corresponds to that shown in Figs. 4 and 5, and in which the electric energy from the electrodes is maintained constant throughout their entire traverse by maintaining their rates of endwise feeds constant. In this diagram of Fig. 6, the end wire electrodes 18 and 21 are represented for purposes of illustration as having an endwise constant feed of 67 inches per minute, while the two intervening electrodes 19 and 20 are shown having constant endwise feeds of 45 inches per minute.

It should also be noted from an inspection of Fig. 5 that in a process in which the electric energy input from each wire electrode is maintained constant throughout its traverse relative to the workpiece to be fused, the total energy input from each pair of successive wire electrodes per unit of length of electrode traverse during their overlapping courses is much greater than the energy input derived from these electrodes during the remaining portions of their travels. This condition is indicated by the composite curves in Fig. 5 marked 18+19, 19+20, and 20+21, representing the total energy inputs from corresponding successive electrodes during these courses. As a result of this varying energy input into the surface of the workpiece 10, the extent of fusion of this surface will vary, the depth of penetration being greater where the energy input is greater, so that the penetration line A will have an irregular undulating form as shown in Fig. 4.

The increase in energy input near the left-hand end of the relative stroke of electrode 18, and near the right-hand end of the relative stroke of electrode 21, due to the slowing down of these electrodes near the ends and the beginnings of their strokes, is desirable, since these energy increases result in deeper fusion of the base metal workpiece 10 at its ends, and therefore in the production of a composite billet having an alloy coating which is thicker at the ends, as indicated by the penetration line A in Fig. 4. It is desirable to have a greater depth to alloy coating metal at the ends of the composite billet, as this reduces losses through overroll during working of the billet.

In accordance with the present invention, the depth varying conditions shown in Figs. 4, 5 and 6 are avoided, except at the ends of the composite billet, by substantially equalizing the total energy input from the wire electrodes into the bonding surface of the base metal workpiece 10 per unit length of traverse of the electrodes during their oscillation strokes relative to said surfaces. The depth of fusion of said surface is thereby advantageously controlled to produce a substantially straight penetration line A' shown in Fig. 7. In the specific form of the invention shown, this substantial equalization of the total energy input from the wire electrodes per unit length of their traverse is accomplished by reducing the endwise feed of the electrode of each pair of successive electrodes as they are consumed, and while they are travelling along their overlapping courses. In Fig. 8 is shown, for example, a diagram indicating the endwise electrode feed of the wire electrodes 18, 19, 20 and 21 in different phases of their oscillating cycle in accordance with an embodiment of the present invention. It is noted from this diagram that the end electrode 18, for example, has an endwise feed at 67 inches per minute for a portion of its forward relative travel, and when it reaches the beginning of the course of relative travel of the next successive electrode 19, this electrode feed is reduced to 30 inches per minute, and is maintained at this reduced value for the remainder of this forward stroke, and for the initial portion of its return stroke until said electrode 18 leaves the course of travel of the other electrode 19. The other end electrode 21 has a similar feed characteristic with respect to its companion electrode 20. The endwise feed of the intermediate electrodes 19 and 20 is maintained at a constant value of 30 inches per minute during their entire relative strokes. The exact values for the electrode feeds set forth in Fig. 8 are not intended as a limitation of the scope of the invention, but merely as an illustration of an embodiment of the invention, since these values depend on different variable factors, such as the size of the composite billet to be produced, its composition, the number and characteristics of the wire electrodes, etc.

As far as certain aspects of the invention are concerned, the endwise feed rate of the intermediate electrodes 19 and 20 may also be reduced during the overlapping courses of their oscillating travels. However, to obtain such variations in the feed of the intermediate electrodes 19 and 20, in addition to the variations in the feed of the end electrodes 18 and 21, there is required a more complicated apparatus than that shown.

By reducing the feed of endwise movement of the electrodes 18 and 21 during the portions of their relative travels overlapping the relative travels of their companion electrodes 19 and 20, the energy input into the workpiece 10 opposite these overlapping electrode travels is not materially increased, so that a penetration line A', substantially straight except for its inwardly extending end sections, results from the process of the present invention, as shown in Fig. 7. This inward extension of the penetration line A' at its ends produces an alloy coating which is thicker at the ends and is desirable for the reason set forth in the discussion of the penetration line A of Fig. 4.

As far as certain aspects of the invention are concerned, the control means for changing the current input from the electrodes 18 and 21 during their relative overlapping travels with respect to the electrodes 19 and 20 may take any suitable form. In the specific form shown in Fig. 3 for the purpose of illustration, the truck 49 may carry two trips 60 and 61 adapted to engage two spring-pressed switches 62 and 63 respectively at certain phases of the oscillating cycles of said truck 49. These switches 62 and 63 may be in the field or armature circuits of the feed motors 46 of the wire electrodes 18 and 21 respectively, or may be connected into any other circuits controlling the speeds of said motors, in a manner well-known in the motor speed control art. For example, the switch 62 controlling the speed of the feed motor 46 for the wire electrode 18 may be in the circuit of a suitable relay device which is behind the control panel 50, and which is operable in the closed position shown in Fig. 3 to shunt out a predetermined amount of resistance in the armature or field circuit of said motor, and thereby to operate said motor at its greater speed. This greater motor speed is indicated in Fig. 8 as affording an electrode feed of 67 inches per minute. At the same time, the switch 63 controlling the speed of the feed motor 46 for the wire electrode 21 may be in the circuit of a suitable relay device which is also behind the control panel 50, and which is operable in the opened position shown in Fig. 3 to cut in a predetermined amount of resistance in the armature or field circuit of said motor, and thereby to operate said motor at its lower speed. This lower motor speed is indicated in Fig. 8 as affording an electrode feed of 30 inches per minute.

As the truck 49 is moved to the left in its forward stroke from the position shown in Fig. 3, the switch 62 remains closed and the switch 63 remains opened, so that the electrode 18 is being fed at 67 inches per minute, and the electrode 21 is being fed at 30 inches per minute. At the same time, the electrodes 19 and 20 are being fed at a constant rate of 30 inches per minute. When the electrode 18 reaches a position in its relative forward stroke corresponding to the beginning of the relative stroke of the next successive electrode 19, the switch 62 will be engaged by the trip 60 and opened thereby, so that the feed of said electrode 18 will be reduced from 67 inches per minute to 30 inches per minute. Approximately at the same time, when the electrode 21 is beginning to move relatively away from that part of its course overlapping the course of the electrode 19, the trip 61 will release the switch 63, and will permit it to close by spring action, so that the speed of the motor 46 feeding said electrode 21 will be increased to its full value of 67 inches per minute.

The motor speed conditions effected by the opening of the switch 62 and the closing of the switch 63 continues until the wire electrodes reach the right-hand end of their re'ative forward stroke. This motor speed condition continues during the relative return stroke of the wire electrodes, until the electrode 21 reaches the beginning of the overlapping course of the electrode 20 and the electrode 18 begins to move away from the overlapping course of the electrode 19. Approximately at this time, the switch 62 is returned into closed position, and the switch 63 is engaged into opened position, so that the feed of the electrode 21 is reduced to 30 inches per minute, and the feed of the electrode 18 is restored to 67 inches per minute.

The reduction in the feed of the wire electrodes 18 and 21 during their overlapping courses with respect to their companion wire electrodes 19 and 20 reduces the total current input from the wire electrodes into the bonding surface of the base metal workpiece 10 along said overlapping courses. The surface fusing energy into this surface per unit length thereof is thereby substantially equalized, except at the ends, so that a substantially straight penetration line A' is produced.

Since electrodes 18, 19, 20 and 21 are curved, as shown in Figs. 2 and 3, to provide surface metal fusing gaps between their respective ends and the surface 12 of the solid metal 10, their discharge characteristics cannot be used to control their upward movement along the surface 12. Furthermore, it is important if the desired fusion of metal 10 is to be obtained that the discharge ends of electrodes 18, 19, 20 and 21 be raised as the level of the molten metal rises so as to maintain such ends in a fixed positional relationship relative to the rising level of the molten metal. Consequently, to maintain the fixed positional relationship just mentioned contact device 24 is raised through motor 30 to raise the discharge ends of electrodes 18, 19, 20 and 21 as required to maintain said relationship. For this purpose motor 30 may be operated at a constant speed determined by the rate of rise of the molten metal level, to raise contact device 24. In this operation the molten metal level will rise at a constant rate. When this procedure is employed hollow electrodes 16 and 17 may also be driven at a constant rate. Alternatively, hollow electrodes 16 and 17 may be driven, through the arc control arrangements incorporated in back of panel 50, to maintain a discharge of substantially constant characteristics at their discharge ends so that their discharge ends will be kept at a substantially fixed distance from the surface of the molten metal. If this is done the discharge from the discharge end of either electrode 16 or 17 may be used, through arc control arrangements of the character previously referred to, to control motor 30 so as to raise contact device 24 at the rate necessary to maintain a fixed positional relationship between the discharge ends of electrodes 18, 19, 20 and 21 and the surface of the molten metal.

As many changes can be made in the above method and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. The method of integrally uniting metals to produce a composite article, which comprises oscillating a plurality of electrodes as a unit relative to the surface of a solid metal body while said electrodes are in fusing position with respect thereto, and while they are spaced along said surface apart in row-like arrangement, to fuse said surface by the electric energy emanating from said electrodes, the oscillating strokes of said electrodes being sufficiently long to cause successive electrodes to overlap in their courses for substantial distances at the ends and beginnings of their strokes, reducing the electric energy emanating from an electrode of each pair of successive electrodes per unit length of electrode traverse during the overlapping portion of its oscillation stroke relative to said body to maintain a substantially constant electric energy input per unit length of said surface fused at said overlapping portion and thereby to effect a substantially straight penetration line, advancing said electrodes as a unit relative to said surface and in a direction transverse to the direction of relative oscillating movement of said electrodes to effect progressive areal coverage of said surface by said electrodes in surface fusing relationship therewith, and depositing molten metal in contact with the fused surface of said body to effect an integral bond between said metals.

2. The method of uniting metals to form a composite article which comprises oscillating a plurality of electrodes as a unit through overlapping courses relative to a substantially flat surface of a solid metal body, while said electrodes are in fusing position with respect thereto, and while they are spaced apart in row-like arrangement along said surface whereby said surface is fused by the electric energy from said electrodes, the oscillating strokes of said electrodes being sufficiently long to cause successive electrodes to overlap in their courses for substantial distances at the ends and beginnings of their strokes, reducing the total electric energy from said electrodes per unit length of electrode traverse during the overlapping portions of their oscillating strokes relative to said body while maintaining the energy from said electrodes per unit length of electrode traverse substantially constant for a major portion of the remaining phases of said relative oscillation strokes to maintain a substantially constant electric energy input per unit length of said surface fused by the oscillating strokes of said electrodes, advancing said electrodes as a unit relative to said surface and in a direction transverse to the direction of relative oscillating movement of said electrodes to effect progressive areal coverage of said surface by said electrodes in surface fusing relationship therewith, and integrally welding another body of metal to said fused surface to produce the composite article.

3. A method of integrally uniting two metals to produce a composite article, which comprises oscillating a plurality of heat generating electrodes as a unit relative to the surface of a solid metal body while said electrodes are in metal fusing position with respect thereto, and while they are spaced apart in row-like arrangement along said surface, to fuse said surface, the oscillation strokes of said electrodes being sufficiently long to cause successive electrodes to overlap in their courses for substantial distances at the ends and beginnings of their strokes, feeding the intermediate electrodes of said row-like arrangement at a constant rate throughout their oscillating strokes while feeding the end electrodes at respective constant rates approaching said rate during the overlapped portions of their courses and at higher respective constant rates during the non-overlapped portions of their courses to equalize the energy input throughout the extent of said surface fused by said electrodes, advancing said electrodes as a unit relative to said surface and in a direction transverse to the direction of relative oscillating movement of said electrodes to effect progressive areal coverage of said surface by said electrodes in surface fusing relationship therewith and depositing molten metal in contact with the fused surface of said body, to effect an integral bond between the metals.

4. The method of uniting metals to form a composite article which comprises oscillating a plurality of electrodes as a unit through overlapping courses relative to a substantially flat surface of a solid metal body, while said electrodes are in fusing position with respect thereto, and while they are spaced apart in row-like arrangement along said surface whereby said surface is fused by the electric energy from said electrodes, the oscillating strokes of said electrodes being sufficiently long to cause successive electrodes to overlap in their courses for substantial distances at the ends and beginnings of their strokes, feeding some of said electrodes at respective constant rates throughout their oscillating strokes while feeding others of said electrodes at respective constant rates during the non-overlapped portions of their respective strokes and at lower constant rates during the overlapped portions of their respective strokes to maintain the total electric energy input from said electrodes per unit length of said surface subjected to fusion substantially constant, advancing said electrodes as a unit relative to said surface and in a direction transverse to the direction of relative oscillating movement of said electrodes to effect progressive areal coverage of said surface by said electrodes, and integrally welding another body of metal to said fused surface to produce a composite article.

ROBERT K. HOPKINS.

REFERENCES CITED

The following references are of record in the file of this patent:

UNITED STATES PATENTS

| Number | Name | Date |
| --- | --- | --- |
| 1,241,900 | Armstrong | Oct. 2, 1917 |
| 1,711,633 | Dornseif | May 7, 1929 |
| 2,113,667 | Swift | Apr. 12, 1938 |
| 2,151,914 | Hopkins | Mar. 28, 1939 |
| 2,191,469 | Hopkins | Feb. 27, 1940 |
| 2,191,476 | Hopkins | Feb. 27, 1940 |
| 2,191,481 | Hopkins | Feb. 27, 1940 |
| 2,279,990 | Hopkins | Apr. 14, 1942 |